(12) United States Patent
Jordan

(10) Patent No.: US 8,323,720 B2
(45) Date of Patent: Dec. 4, 2012

(54) PROCESS FOR FORMING SHAPED FOODS FROM FRUIT MEAL

(76) Inventor: J. Kirk Jordan, Franklin, TN (US)

( * ) Notice: Subject to any disclaimer, the term of this patent is extended or adjusted under 35 U.S.C. 154(b) by 247 days.

(21) Appl. No.: 12/919,820

(22) PCT Filed: Feb. 26, 2009

(86) PCT No.: PCT/US2009/035262
§ 371 (c)(1),
(2), (4) Date: Aug. 27, 2010

(87) PCT Pub. No.: WO2009/111261
PCT Pub. Date: Sep. 11, 2009

(65) Prior Publication Data
US 2011/0014343 A1 Jan. 20, 2011

Related U.S. Application Data

(60) Provisional application No. 61/032,916, filed on Feb. 29, 2008.

(51) Int. Cl.
*A23L 1/0524* (2006.01)

(52) U.S. Cl. ........ 426/577; 426/640; 426/512; 426/520; 426/524

(58) Field of Classification Search .................. 426/577, 426/615.616, 640, 512, 515, 518, 520, 524
See application file for complete search history.

(56) References Cited

U.S. PATENT DOCUMENTS 3,705,814 A * 12/1972 Rahman et al. ............... 426/310
3,970,761 A 7/1976 Wenger et al.
3,998,977 A 12/1976 Rabeler
4,036,997 A * 7/1977 VerBurg ........................ 426/272
4,038,433 A 7/1977 Manser et al.
4,889,730 A 12/1989 Roberts et al.
5,146,844 A * 9/1992 Dubowik et al. ............. 99/450.6
5,358,727 A * 10/1994 Yates et al. .................... 426/512
5,523,106 A 6/1996 Gimmler et al.
(Continued)

FOREIGN PATENT DOCUMENTS

WO 0041574 7/2000

OTHER PUBLICATIONS

TreeTop, "Evaporated Apples", TreeTop, published at least as early as Apr. 7, 2006, Washington.

(Continued)

*Primary Examiner* — Drew E Becker
(74) *Attorney, Agent, or Firm* — Locke Lord LLP

(57) ABSTRACT

The disclosure provides a process for producing a ready-to-eat (RTE) fruit food product, comprising: obtaining a quantity of granulated fruit meal; and forming the fruit meal into a predetermined shaped product, comprising: applying a heat sufficient to cause the fruit meal to become tacky; and applying a compressive force to the tacky fruit meal to form the predetermined shape. In one embodiment, the process can use a mold to form the predetermined shape. Importantly, the fruit food product can be formed into a stable predetermined shaped product independent of baking the product. The heat sufficient to cause the fruit meal to be come tacky generally causes the fruit meal to be between 80° F. (27° C.) to 200° F. (93° C.). For example, the compressive force can between 1 pound force (0.4 kilograms) to 16 pounds force (7.3 kilograms) for an exemplary 2 inch (5 cm) cookie/biscuit.

21 Claims, 2 Drawing Sheets

U.S. PATENT DOCUMENTS

| 5,554,406 | A | * | 9/1996 | Muenz et al. | 426/573 |
|---|---|---|---|---|---|
| 5,718,931 | A | | 2/1998 | Walter et al. | |
| 6,027,758 | A | | 2/2000 | McHugh et al. | |
| 6,200,616 | B1 | * | 3/2001 | Axelrod et al. | 426/285 |
| 7,569,244 | B2 | * | 8/2009 | Jordan | 426/615 |
| 2003/0232110 | A1 | | 12/2003 | Hayabuchi et al. | |
| 2004/0022901 | A1 | | 2/2004 | Funk | |
| 2004/0219271 | A1 | | 11/2004 | Belknap et al. | |
| 2006/0286270 | A1 | * | 12/2006 | Jordan | 426/620 |

OTHER PUBLICATIONS

Invertec Foods, "Evaporated Apples", Invertec Foods, Product Data Sheet, [retrieved from the Internet on Apr. 5, 2006 using <URL: http://www.sacarlson.com/invertecevapapples.htm>].

Van Zuilichem, D.J., Kuiper, E. and Stolp, W., "Extrusion-cooking technology for the confectionery industry", Department of Food Technology, Wageningen University of Agriculture, dated Nov. 19, 2004, Wageningen, Netherlands.

Seedburo, "Ro-Tap Testing Sieve Shaker", Seedburo Equipment Company, Product Data Sheet, published at least as early as Apr. 7, 2006, Illinois.

Styron Asia Limited, "Processing Extruding Polystyrene Resins: Extruder Screw Design", owned by Dow Chemical Company and Asahi Kasei Corporation, [retrieved from the Internet on Mar. 11, 2005 using <URL: http://www.dow.com/sal/process/ext/ext3.htm>].

Ocean Spray, "The History of Ocean Spray Cranberries, Inc.", published at least as early as Apr. 7, 2006, three pages.

"Cooking extrusion", [retrieved from the Internet on Dec. 1, 2004 using <URL: http://www.designstudio.mae.cornell.edu/realization/creal-module/3-cooking-extrusion.html>].

Delorenzi, S., International Search Report for International Patent Application No. PCT/US2009/035262, European Patent Office, dated Jun. 17, 2009.

Delorenzi, S., Written Opinion for International Patent Application No. PCT/US2009/035262, European Patent Office, dated Jun. 17, 2009.

* cited by examiner

PROCESS FOR FORMING SHAPED FOODS FROM FRUIT MEAL

BACKGROUND

1. Field of the Invention

The invention relates to fruit food processing and products produced therefrom. More specifically, the invention relates to a process of producing high fruit content ready-to-eat foods through form shaping.

2. Description of Related Art

Since Adam and Eve, fruit has been universally recognized as a highly desirable food. Further, the need for consuming significant quantities of fruit for nutritional purposes is well documented. One reason the public does not consume the recommended quantities of fresh fruit is spoilage; fruit is highly perishable. Thus, the fruit is typically processed to extend its life by canning, freezing or by various evaporative approaches such as sun drying (raisins), hot air drying (dried fruit), freeze drying (blueberries for dry cereal), frying (sliced bananas), spray drying (fruit powders) and dehydration to very low moistures (for dry cereals).

Each of these processes has its strengths and weaknesses. Sun drying in the desert works well in California apricots, but not in Washington apples, Michigan cherries, or Florida tomatoes. Hot-air drying makes soft fruit lacking the crispness of fresh fruit and can yield to mold and yeast spoilage over time. Freeze drying is an elegant way to dry fruit, but it is very expensive (an order of magnitude greater than fresh fruit weight-for-weight), limiting it to high-margin products or small percentages in foods. Frying imparts fat, offsetting the nutritional value and flavor of fruit. Spray drying of fruit, limited mostly to pulp-free juices, requires a carrier, such as maltodextrin, that limits the fruit content. Dehydration to moisture less than 3% depletes volatile flavors and makes a crispy but hygroscopic fruit that rapidly absorbs humidity and can become tough and hard.

Although it would be desirable to form edible high fruit content foods, the potential for providing such fruit foods is limited by the processing difficulties associated with fruit compared to other food foods. For example, extrusion technology is employed extensively throughout the grain processing industry (but not in fruit processing) to cook grain-based and soy foods because the process is energy efficient, reliable, and sanitary. Major industry segments utilizing extrusion cooking include ready-to-eat cereals, snacks, pet foods, industrial pre-gelled flours, and many others.

Starches, flours, and meals milled from grain have traditionally been used by those skilled in the art of extrusion to manipulate texture and density of cereal foods, such as ready-to-eat breakfast cereals; snacks, such as corn puffs and onion rings; pet foods, such as kibbled dog foods; and many other foods. Starches are long-chain carbohydrates that, when gelatinized by extrusion cooking, form films capable of trapping gas (air and steam) in thin-walled, honey-comb-like structures, aerating the product ("puffing"), and reducing the density.

Some limited attempts to use extrusion technology for fruit have met with mixed results. Typically, the fruit content is severely limited, and in some cases eliminated, so that the technology is virtually identical to the extrusion cooking of grain without fruit. In such cases, the principal ingredients are flours, starches, sugars, gels, gums, flavors and colors, with a small percent of dried or powdered fruit. Fruit powders have been added in low percentages such as in some popular breakfast cereals to impart fruit flavor, color, or marketing sizzle to starch-based puffed foods.

Extrusion technology uses a cooking extruder. A cooking extruder is typically a screw machine that accepts free-flowing grain meal or flour as in-feed material into a progressively reducing, spiral-screw cavity. As the material progresses along the screw or multiple screws of the extruder, the in-feed material is hydrated by water injection (for example, from a 10-12% in-feed moisture to a 15-30% dough moisture), and the moistened material is compressed and heated by friction to "pressure cook" the extrusion dough with the moisture encapsulated as steam. Typically, extrusion in-feed materials must be uniformly free flowing and finely granular, both hallmarks of milled grains such as corn meal, wheat and rice flours, etc. By contrast, fruit foods (i) are not as free flowing, causing stoppage of the in-feed material (except in forms too liquid for extrusion cooking), (ii) are often heterogeneous in particle size or granulation, and (iii) are hygroscopic when dried. These characteristics during the 55-year history of food extrusion processing have virtually eliminated extrusion cooking from consideration when processing fruit.

Baking, another commonly used process for forming a product, also has difficulties producing a high fruit content product. As background, baking is a process in which grain-based carbohydrates (typically ground flours or meals derived from wheat, corn, rice, etc.) are admixed with various other functional ingredients (liquids such as water or milk, flavorings such as sugars or salt, texture elements such as fats, leavening agents such as yeast or sodium bicarbonate, etc.) to form a batter or dough, then heated (hot air, hot oil, hot solid surface, direct flame, etc.) to create digestible foods. Ungelatinized (uncooked) flours are poorly digested in the stomach, and can create gastrointestinal and nutritional dysfunctions if consumed raw. Baking is a process that simultaneously cooks the grain-based ingredients (i.e., gelatinizes the starches) and dries the food into a soft, chewy or hard (crispy, crunchy, etc.) food form. Generally baking transforms a raw food, composed of ungelatinized starches, unprecipitated proteins, inactive leavens, etc., from a thick batter or dough form into a drier embodiment that can be readily handled (e.g. a finger food), sliced (e.g., breads, cakes) or broken by hand into edible portions.

For example, in the 19th century, Sylvester Graham promoted a form of whole wheat flour that included the wheat germ. Later in the century, his flour was sweetened with honey, etc. and baked into Graham crackers. In modern times, homemakers have sought easier techniques to create edible pie crusts that did not require the steps of measuring multiple ingredients, skillfully cutting in cold shortening into the dough, rolling and layering the cold dough, and handling of fragile rolled dough to form the pie crust. Consequently, coarsely crushed graham crackers, sugar and melted butter have become popular pie shells for flavor and texture reasons, and especially for their ease of pie crust formation in the kitchen. The tacky mixture is simply pressed by hand into a pie plate, and then baked at 375 degrees F. for 10 minutes to "set" the crust. Graham cracker pie shells formed in food processing plants by this process are ubiquitously available in grocery stores. In the simple graham cracker crust recipe, each ingredient serves multiple functions. The graham cracker crumb, comprising most of the crust recipe, is the pregelatinized carbohydrate source (substitute for raw flour) contributing flavor, texture, and structure to the molded crust. The butter, composed of approximately 82% butterfat and 15-18% water, is respectively the texturizing (fat) component and the liquid (solublizing) component that makes the granular mixture tacky. The granular sugar becomes dissolved in the moisture as the baking temperature rises; then it recrystalizes into a structural, glue-like element of the crust after baking desiccates the crust. Upon cooling, the butterfat congeals to further strengthen the crust structure. Thus the baking of the pressed, tacky granular mixture at 375 degrees for 10 minutes is a traditional use of baking to dry the crust for structural and crisping reasons.

Such a baking process would be difficult to produce a high fruit content product with crispy or crunchy characteristics or other characteristics, because the baking process uses a pregelatinized carbohydrate source not found in fruits. Further, the heat commonly associated with baking temperatures may adversely affect the nutritional value and other aspects of a high fruit content product. A different process for forming high fruit content products is needed.

Another process for molding three-dimensional shapes of a granular starch-based food was developed in Belgium in the late 19th century. Sugar cubes are made by moistening granular sugar to approximately 1% water content, then pressing the tacky granular mixture at room temperature to form a cube, then desiccating the cubes with heat lamps to "set" the structure of the sugar cube without melting the sugar. The Applicant understands that in this process, the starting material, pure crystalline sucrose with 0% water, is wetted to approximately 1% water to create a slightly tacky mixture, which is then added loosely into a mold and cold-pressed in the form to create a cube shape. The sucrose crystals contain a high level of moisture on the outside of each crystal, while the inside of the crystal remains essentially at 0% moisture. The moisture on the outside of the crystal allows a limited degree of sugar "melting" (depending on the amount of water added) that with desiccation will become the "glue" that will anneal the crystals together into the cube shape. After formation of the cube, the room temperature shapes are extracted immediately, then heat is applied to the formed piece to desiccate it as soon as possible back toward 0% water. The purpose of the heat is to remove all the added water, a step analogous to the desiccation function of baking. However, since the heating process desiccates from the outside in, the core of the cube retains a relatively higher moisture level that must equilibrate in a "conditioning" step that occurs over a day or so prior to packaging. The restored molecular crystalline structure resists moisture pick up under ordinary dry storage conditions, allowing packaging in porous containers, such as paper.

Known processing techniques for raw fruit have also not resulted in a satisfactory high fruit content food that can meet the needs of consumers. Extrusion principles, baking, and moistening processes that are used for starch-based products traditionally have not resulted in a satisfactory high fruit based food. Thus, there remains a need for a process that can form a high fruit content food with desirable characteristics.

BRIEF SUMMARY

The disclosure provides a process for producing a ready-to-eat (RTE) fruit food product, comprising: obtaining a quantity of granulated fruit meal; and forming the fruit meal into a predetermined shaped product, comprising: applying a heat sufficient to cause the fruit meal to become tacky; and applying a compressive force to the tacky fruit meal to form the predetermined shape. In one embodiment, the process can use a mold to form the predetermined shape. Importantly, the fruit food product can be formed into a stable predetermined shaped product independent of baking the product. The heat sufficient to cause the fruit meal to be come tacky generally causes the fruit meal to be between 80° F. (27° C.) to 200° F. (93° C.). For example, the compressive force can between 1 pound force (0.4 kilograms) to 16 pounds force (7.3 kilograms) for an exemplary 2 inch (5 cm) cookie/biscuit.

The disclosure provides a process for producing a ready-to-eat (RTE) fruit food product, comprising: obtaining a quantity of granulated fruit meal; forming the fruit meal into a stable predetermined shaped product comprising: applying a heat sufficient to cause the fruit meal to become tacky; and applying a compressive force to the tacky fruit meal to form the predetermined shape.

DETAILED DESCRIPTION

Figure 1:
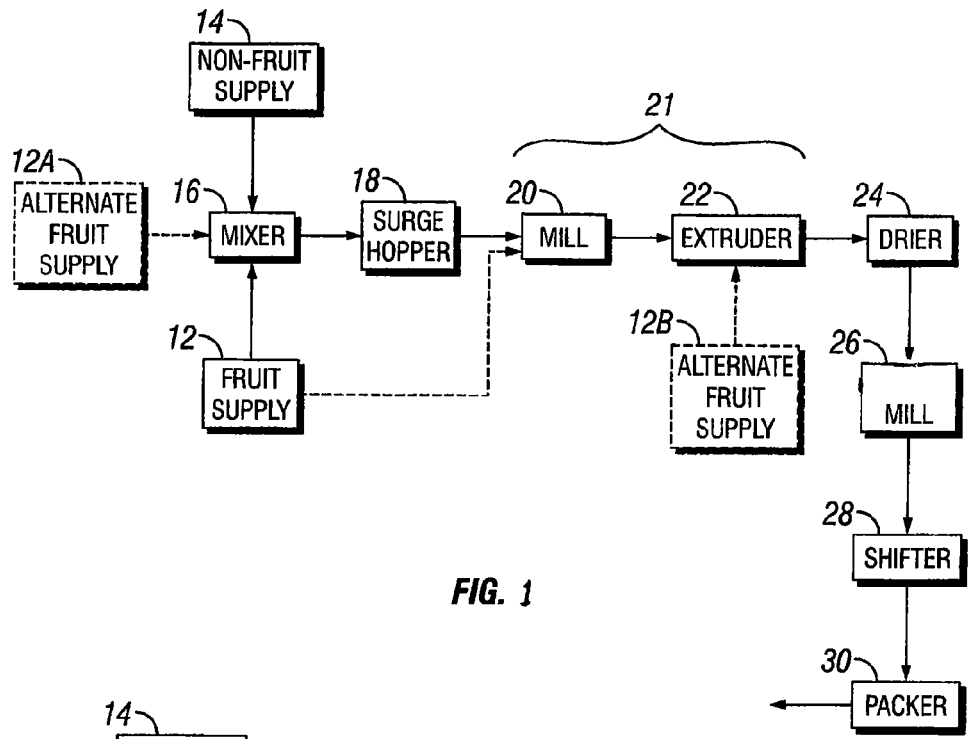
FIG. 1 is a schematic diagram of an exemplary embodiment of a system to produce the high fruit content fruit meal.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The present disclosure provides a solution to heretofore conflicting interests of providing a high percentage of fruit in a stable, predetermined shape product that is independent of baking and baking's reliance on starches in creating gelatinized food products. The process discloses a different direction than would traditionally be pursued to create products such as cookies, biscuits, and other traditionally baked food products to create a similarly shaped fruit food product without the starches. The disclosed process uses a lower temperature for a granulated fruit meal than traditionally is used for baked products in combination with a compressive force to shape the heated fruit meal into a predetermined shape. The shaped product is allowed to cool at least partially to an ambient temperature and can maintain its formed shape under standard conditions without reverting to a preprocessed configuration. The process can produce a shaped fruit food product that can provide the sensation of being crispy, even though each granule of the fruit meal formed into the fruit food product may itself be hard.

The fruit foods may be composed 100% of a single fruit ingredient; or the fruit foods can be composed 100% of a combination of several fruit ingredients; or the fruit foods may be composed of fruit ingredients co-processed with other non-fruit food ingredients, such that fruit ingredients comprise at least one-third (33%) by weight of all the ingredients, advantageously at least 75%, and more advantageously at least 90%, and most advantageously, at least 99%. The disclosure provides a new category of unique food products composed mostly of fruit (up to 100%) and other food ingredients and fashioned in various dry or semi-moist physical forms. The products of the invention can be variously described as a chewy, crispy, crunchy, or hard RTE, shelf-stable foods composed totally or mostly of fruit.

The disclosed process uses fruit that generally has been formed into a granulated substance, referenced herein as "fruit meal." Even though the presently claimed subject matter is not directed to the production of fruit meal, for the sake of disclosure, the following section discusses the production of fruit meal.

Fruit Meal Production

The manufacturing process for the fruit meal is a series of steps in which dried fruit or dried fruit with other ingredients are mixed, homogenized, extruded, dried, sized, and packaged. The process of the invention can be described as a series of sequential processing events, including a steady presentation of the homogeneous ingredient(s) to a high pressure/high temperature extrusion processor, followed by drying with heat, milling and sifting for sizing, and packaging in a vapor barrier to prevent the hygroscopic absorption of moisture from the ambient air into the food product.

For the purpose of the present disclosure, the following terms and their meanings can assist in understanding the disclosure. The term "product moisture" includes the weight of water in the product relative to the weight of dry material, expressed as a percent. The moisture content is usually determined by weighing a sample, then desiccating it under vacuum and heat, and re-weighing the sample to ascertain the moisture loss in accordance with a standardized procedure by the Association of Official Analytical Chemist (AOAC) 934.06 for dried fruit. The term "water activity" ("Aw") is related directly but non-linearly to moisture and can be practically thought of as the relative humidity inside a product. "Aw" measures the vapor pressure of the moisture in a hygroscopic material at a specific temperature, expressed as follows:

$Aw=p/ps$ and % humidity=$100(Aw)$ where:

p=the partial pressure of water vapor of the product, and
ps=the partial pressure (saturation) of water vapor of pure water.

In foods, water activity is most often used as an expression of the moisture available to support microbiological growth. Most bacteria require an Aw of at least 0.91 and most molds require at least 0.80, although a few osmophilic microorganisms can live as low as 0.60.

The term "hygroscopic" characterizes dry materials that tend to absorb water, usually from air. Desiccants are hygroscopic materials intended to absorb moisture from a product in a confined space, thus keeping the product dry while raising the moisture level of the desiccant. Foods that are hygroscopic tend to absorb humidity from air or to redistribute moisture in heterogeneous foods, e.g., sun-dried raisins transferring moisture to hygroscopic bran flakes, resulting in hard raisins and stale bran flakes.

The term "gel" is used to indicate a semi-rigid solid mass, a colloidal suspension composed of a liquid phase and a solid phase in which the liquid molecules have been absorbed in the solid molecules.

The term "fruit meal" is used to indicate a flowable substance of principally fruit granules. The fruit meal can be formed by the extrusion process described herein. In at least one embodiment, the fruit meal could have a granulation similar to traditional corn meal, but granulations smaller and larger are contemplated.

The term "stable" is used to indicate the fruit product will remain substantially in the same shape as it is formed after processing.

Fruit products of the disclosure that are composed of 100% fruit may be formulated from a single fruit (e.g., dried apple); or from blends combining a single fruit with a fruit fraction of that same fruit (e.g., dried apple and dried apple pulp); or from one or more fruits combined with fractions of a different fruit (e.g., dried apricot and dried apple and optionally combined with a dried fruit pulp). In addition to formulations processed entirely from dried fruit pieces (e.g., dried apple pieces) or entirely from dried fruit grinds (e.g., dried apple grinds), or from a combination of dried fruit pieces and dried fruit grinds, other formulations that include edible fruit fractions (e.g., dried apple pulp or dried apple juice powder or dried apple puree powder) may be created to make a processed food product that is 100% fruit. These combinations of dried fruits and dried fruit fractions may be incorporated into a formulation to achieve certain functional properties, such as enhanced fruit fiber content, enhanced flavor or color levels, cost containment, and so forth. In at least one embodiment, a fruit food product can be made from 100% fruit composed of a single dried fruit or of blends of various dried fruits or of blends of dried fruits and dried fruit fractions in their various physical forms.

The term "dried fruit grinds" as a subset of dried fruit is intended to include the homogenized fruit tissue from dried fruit, with or without the fruit peel and tiny seeds depending on the fruit, and minus the stems, pits and large seeds to the extent technologically possible. The term "dried fruit pulp" is intended to indicate the fruit fraction remaining after fruit juice is pressed from the fruit, and the residual fruit solids are dried to a powder with a moisture content of approximately 5%. The term "dried fruit powder" is intended to include the dried fruit solids derived from fruit puree or fruit juice ground and sifted to a fine powder with moisture less than 3.5%.

The fruit meal or products produced from the fruit meal can contain less than 100% fruit, i.e., formulations composed of (1) dried fruit or combinations of various kinds of dried fruit or dried fruit fractions in their various physical forms as the primary in-feed ingredient(s), and of (2) one or more non-fruit ingredients. The various non-fruit ingredients can be dry blended with the dried fruit prior to extrusion and processed as a homogeneous fruit-and-non-fruit mixture to achieve certain product characteristics, such as sweetness levels, textural effects, color intensities, aromas, and other features. A partial list of these functional non-fruit ingredients includes: dry or liquid sweeteners (e.g., fine granular sugar), texture stabilizers (e.g., wheat starch or rice flour), nutrition enhancers (e.g., proteins, vitamins, and minerals), colors, flavors, and other food-grade ingredients and food additives. For example, a fruit food product can be composed of (1) fruit and/or fruit fractions in sufficient quantity that the sum of the fruit components equals at least one-third of the fruit product and advantageously higher percentages by weight up to 100% and any percentage therebetween, such as 40%, 50% and so forth, and any percentages between such exemplary percentages, such as 41%, 42%, and so forth, and further any percentages between such exemplary percentages, such as 41.1%, 41.2%, and so forth.

In this disclosure, one starting material is food-grade dried pieces of intact fruit tissue known as "dried fruit" or "evaporated fruit," such as dried apple or dried apricot. Dried fruit is an industrial and retail ingredient readily available in various physical forms and specifications in the world market place. The fruit is dried after harvest to a moisture level consistent with preservation for at least a year when stored in a dry warehouse at temperate or cool storage temperatures. The actual moisture level in dried fruit depends on the individual fruit, the level of soluble solids in the fruit, the presence or absence of added chemical or osmotic preservatives, and other factors. However, in general, dried fruit has a moisture range between 13 and 30%. Post-harvest fruit dehydration functions as a physical preservative to strongly inhibit further ripening and degradative growth of microorganisms, especially yeasts and molds. In the market place, dried fruit is variously offered with or without sulfur dioxide ($SO_2$), a food additive that assures flavor and color retention in the dried fruit and that is largely dissipated by the processing of this invention. Such dissipation through the processing of this disclosure is important because some people can experience allergic respiratory distress when exposed to sulfur dioxide levels above their symptomatic threshold. In the manufacture of these processed products made from up to 100% fruit, the dried fruit is fed directly into the extrusion processor, either into the feed section of the extruder or into a conditioning cylinder before the feed section or into other upstream equipment. In contrast to the prior art, the use of dried fruit eliminates (1) the required extra steps of drying, grinding and sifting of drum-dried fruit puree before extrusion processing, (2) the attendant loss of volatile flavor components associated with drying and grinding, (3) the sanitation and equipment processing challenges associated with handling a highly hygroscopic food ingredient, and (4) the rehydration of the dried puree inside the extruder with added water or other liquids not native to the original fruit.

The dried fruit can be finely chopped and divided into a generally continuous homogeneous in-feed material. This step is accomplished by passing the dried fruit through an Urschel™ mill (generally equipped with a fine cutting head), a cutting head affixed to a grinder such as a hamburger meat "grinder" that actually cuts the meat or other substance passing through, or other comminuting device, generally referenced herein as a "cutter mill." A "cutter mill" and the contextual term "mill" (and corresponding method "cutter-milling") is defined broadly to include any device that can shear and degrade the cellular structure of the dried fruit pieces into finely divided fruit, thus helping insure the extrusion of a homogeneous, fine in-feed material and resulting in a homogeneous output material (extrudate) at the extrusion die. Because some extruders in the extrusion process are inefficient mills, the insertion of a cutter mill to create a homogenized, milled dried fruit as the in-feed material is preferable to feeding evaporated fruit dices or similar small pieces of intact fruit tissue into the extruder in-feed. An additional advantage is that dried fruit of any size or configuration (whole, sliced, or diced) may be used. Use of a cutter mill to feed the extruder ultimately yields a homogeneous extrudate which, when dried to a very low moisture, makes a crispy, crunchy, or hard piece, lump or granule of fruit. By contrast, the direct extrusion without comminution of dried fruit pieces, such as dried fruit dices with their cellular matrix intact, can lead to a heterogeneous extrudate containing intact pieces of dried fruit buried in a matrix of partially ground fruit. Such intact pieces of fruit, when dried, produce a non-homogenous tough, resilient, or hard imbedded particle of fruit having a texture significantly different from that of the crispy, crunchy, or hard fruit matrix of the present disclosure.

Alternatively, it is possible to configure the tooling, such as screws of an extruder, with a cutting section to function as a cutter mill, to homogenize the soft structure of dried fruit pieces to create a substantially homogeneous fruit mass inside the initial segments of a long barrel extruder. The cutting section would generally be located in the early stages or barrels of the extruder between the feed screw and the traditional cooking section of the extruder. Thus, the cutter mill becomes integral to the extruder. Such an extruder configuration allows feeding dried fruit dices or pieces directly into a feed throat of the extruder without first passing the dried fruit pieces through a comminuting step prior to entering the extruder. The comminuted fruit mass thus created in the initial extrusion barrels proceeds though the pressurizing and heating segments of the extruder in an extrusion process and through an extrusion die, extruding a puffed or slightly expanded porous fruit product substantially free of intact, distinct, dried-fruit fragments.

Another practical starting material of the invention is industrial dried fruit grinds. In commercially available fruit, such as apple, grinds are manufactured by (1) cleaning, peeling and coring the fruit; (2) drying fruit pieces to a moisture adequately low (approximately 24% moisture for apples) to preserve the fruit in a shelf-stable mode at cool temperatures; and (3) extruding the dehydrated pieces through an orifice (die) in a machine similar to a meat grinder, disrupting the cellular structure of the fruit and creating a somewhat sticky homogeneous fruit pieces. In some fruit grinds such as apricot, the fruit is pitted but not peeled. In other fruit grinds such as raisin, the skin and tiny seeds can be included. Commercial fruit grinds take numerous physical forms, including spaghetti-like strings or fruit paste or fruit paste with finely divided particles (e.g., skin or tiny seeds). In this disclosure, extrusion of 100% fruit grinds results in a uniform, homogenized extrudate that is then dried to a crispy or crunchy RTE fruit food, such as an amorphous lump fruit snack; or fruit granules for admixing into dry foods, such as RTE cereals or granola bars; or fine fruit granules or powders used as fruit sprinkle toppings or fruit flavorings. Utilizing fruit grinds as the starting material avoids: (1) the requirement in prior art of extra drying, grinding, sifting and rehydration of fruit puree to extrude 100% fruit foods, and (2) the requirement to pass the dried fruit starting material through any milling step prior to extrusion.

Still another practical starting material is fruit infused with sweetener, such as sucrose or corn syrups. Some fruits, such as blueberries or cranberries, are available in the market place in the infused form rather than or in addition to the uninfused, dried fruit form.

In some cases, the use of dried pieces of intact fruit tissue (dried fruit) is preferable to fruit grinds as a starting material because fruit pieces are free flowing and are less likely to stick in production equipment. However, dried fruit pieces, with their cellular structure largely intact, require additional comminuting before extrusion to disrupt the cellular structure and to minimize the quantity of individual fruit particles that tend to survive the extrusion process and to exit the die as intact dried fruit particles imbedded in the extrudate matrix. The insertion of a mill into the process line to comminute the dried fruit into finely divided fruit pieces ahead of the extrusion step allows the direct use of dried fruit as a starting ingredient. Especially in the case of fruit products composed 100% of fruit tissue, the advantage of finely divided dried fruit over dried fruit grinds is that the former is free flowing and easier to handle in industrial equipment.

In other cases in which the dried fruit is admixed with other dried fruit ingredients, e.g., apple pieces mixed with apple pulp, the use of apple grinds may be preferable because the grinds become coated with the other dry ingredients in the blending step, making the grinds free flowing in the feeding step while eliminating the need for direct cutter milling. Alternatively, the fruit grinds may be force fed into a metering machine, such as a hamburger meat grinder, for the purpose of steady, even feeding of the extruder throat at the entry to the extrusion screw.

Figure 1A:
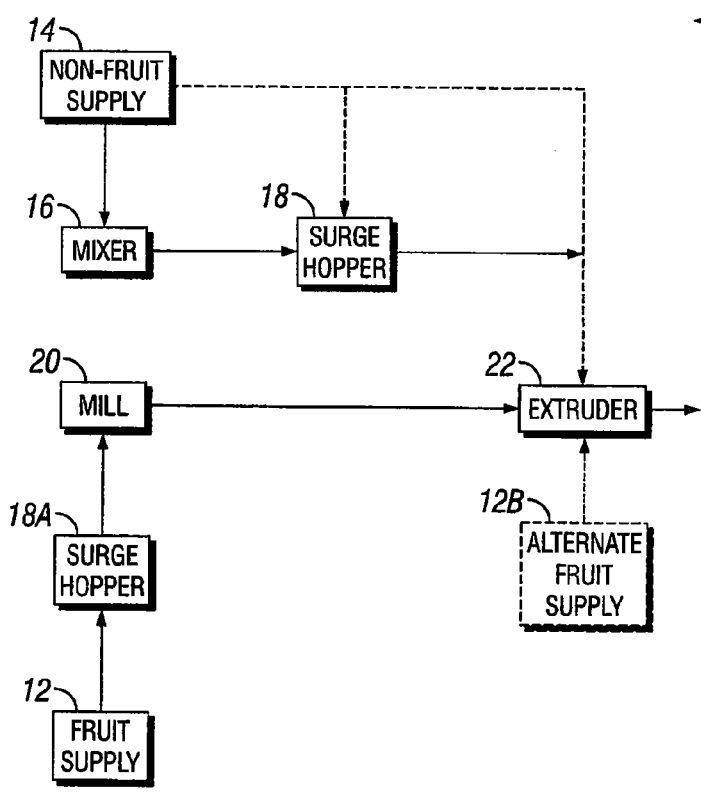
FIG. 1A is a schematic diagram of an alternative of the system shown in FIG. 1.

FIG. 1 is a schematic diagram of an exemplary embodiment of a system and process to produce the high fruit content food products. FIG. 1A is a schematic diagram of an alternative of the system shown in FIG. 1 and will be described in conjunction with FIG. 1. As described herein, different pieces of equipment can be used depending on the starting point of the materials and the desired shape of the finished product. Thus, the exemplary embodiment can be varied and the illustration is not intended to limit alternatives.

The exemplary system 2 represents a production line and includes a fruit supply, an optional non-fruit supply, a mixer depending on the materials, a cutter mill depending on the type of fruit supplied (for example, intact fruit pieces or fruit grinds), a surge hopper, an extruder, a drier, a roller mill depending on the shape of the product desired, a sifter depending on the product desired, and an optional packer. Each piece of equipment will be described below.

The fruit supply 12 can include a supply of fruit products as described herein. In at least one embodiment the fruit supply can include dried fruit pieces in various sizes. In some embodiments, the fruit supply 12 can represent a plurality of fruit supplies of different fruit, different sized and shaped pieces, and different types of fruit forms such as fruit grinds and fruit fiber.

The fruit supply 12 can be coupled to a mixer 16. The mixer 16 can be useful if other materials besides a single fruit source are to be used in producing the product. Alternatively, a fruit source that does not need the mixer can bypass the mixer and perhaps the surge hopper 18, and proceed to the mill 20, described below. Such other materials can be different fruits or fruit forms, such as grinds or fiber, from the fruit supply 12, or non-fruit materials from a non-fruit supply 14. The mixer 16 can be used to blend the in-feed material to provide a relatively homogeneous mixture in those embodiments where multiple in-feed products (products with a plurality of fruits or products with fruit and non-fruit portions) are used. Without limitation, any general food-grade ribbon blender, paddle mixer, V-blender or other design producing a homogeneous mixture may be employed. In some embodiments, the non-fruit supply 14 can supply materials to be blended with the fruit in the mixer 16. As discussed herein, such non-fruit materials can assist in achieving certain product characteristics, such as sweetness levels, textural effects, color intensities, and so forth.

In at least one embodiment, it can be advantageous to include a surge hopper 18 that can be coupled to the mixer 16, if used. The surge hopper 18 can receive the materials from the mixer to provide a buffer in the production line, so that the mill, if used, and the extruder can receive a substantially continuous flow of material.

The surge hopper 18 can be coupled to the mill 20. In at least one embodiment, the mill 20 can include an Urschel™ mill or similar cutter mill to degrade the cellular structure of the dried fruit pieces into finely divided fruit, thus insuring the extrusion of a homogeneous, fine in-feed material. While the term "mill" is broadly used in the food processing industry and generally includes several types of processing, the type of mill used for processing the in-feed dried fruit in this disclosure is used more distinctly to refer to a cutter mill, as opposed to a grinder that grinds the substance or a roller mill. A grinder mill used in prior art to mill grain into flour or to reduce very low moisture fruit flakes and granules down to fruit powder would not be suitable for the relatively high moisture content of the dried fruit. The use of a cutter mill for the food processing of fruit has not been provided prior to the present invention to prepare the in-feed material for extruder processing. Urschel mills as exemplary cutter mills are typically used to slice, dice, or homogenize fresh fruit and vegetables, cheeses, meats, nuts and peanuts, and other soft or wet foods that tend to stick to and foul roller, attrition or hammer mills. The various cutting heads of a cutter mill can be selected to produce different size pieces, as desired. The insertion of a cutter mill to create a homogenized, milled dried fruit as the in-feed material is preferable to feeding evaporated fruit dices or similar small pieces of intact fruit tissue into the extruder in-feed because in general extruders are designed to receive rather than to generate homogeneous material for processing. An additional advantage is that dried fruit of any customary size or configuration (whole, sliced, or diced) can be used to feed the mill. Use of a cutter mill to feed the extruder generally yields a substantially homogeneous extrudate.

Alternatively, if a fruit supply, such as fruit grinds, does not require milling, then the mill can be bypassed or removed from the system and a fruit supply 12A can provide the fruit to the mixer, if other materials are to be added to the fruit as in-feed material to the extruder. Further, if the fruit supply, such as fruit grinds, does not need milling and is otherwise a homogeneous supply, for example, composed of a single fruit, then the mill and mixer can be bypassed or removed from the system and a fruit supply 12B can provide the fruit for the in-feed material to the extruder.

The present disclosure starkly contrasts to traditional extrusion processing. To extrude fruit, traditional thinking starts with fruit powder fed into the extruder to create a homogeneous dough. So technologists have desiccated fruit puree to a powder by various drying, milling and sifting technologies, and then added water into the extruder to create a homogeneous dough. The typical approach has adopted traditional extrusion technology in which field grain, e.g., field corn, is dried, ground into meal, sifted, and hydrated into a dough inside the extruder. Traditional food extruders have been fed by finely granulated dry flowable starch sources, such as grain flours and grain meals. The typical approach has adopted such grain-based technology to fruit extrusions by supplying dry fruit powder to an extruder, not large pieces of wet or intermediate moisture ingredients existent in "dried fruits" having a moisture content greater than the fruit powders. This typical approach applied to fruit has been followed even though (1) fruit desiccation to approximately 5% moisture or less as in-feed fruit powder material before extrusion dissipates volatile flavors and aromas and wastes energy; and (2) fruit powders are so hygroscopic that their use as food ingredients is problematic and impractical under typical extrusion processing conditions. Thus, without the current disclosure, innovation in fruit extrusion continues to be anchored in the traditional grain-based approach of drying, grinding to a powder, sifting, supplying to the extruder, and re-hydrating in the extruder. Perhaps the use of dried fruit pieces has been avoided because the extrusion process is generally very ineffective at milling, inefficient at reducing fruit pieces to a homogenous fruit dough, and the resulting heterogeneous extrudate dries to an unpalatable leathery texture similar to that of fruit pieces desiccated to 5% moisture or less without the texturizing benefits of extrusion processing.

In at least one embodiment, this disclosure provides for the relatively "wet" slicing and milling of dried fruit pieces. Cutter-milling the fruit into comminuted pieces is important to break down the fruit pulp to allow formation of a homogeneous extrusion fruit dough. Dried fruit pieces of any size may be metered into the cutter mill equipped with an appropriate fine cutting head, then continuously discharged into the processing line or directly into the feed section of an extruder. Compared to fruit powder, dried fruit pieces receive less drying and milling, thus conserving aroma and flavor volatiles. Dried fruit is easy to handle in processing equipment and is only slightly hygroscopic because its moisture content (13-30%) is much higher than fruit powder at 5% or less.

The mill 20 can be coupled to the extruder 22 to provide the materials therefrom. The extruder 22 is generally a continuous high-temperature/short-time pressure cooker in which, in the presence of moisture, an Archimedes screw mixes and compresses raw material into a fruit dough and generates frictional heat, shear, and pressure to heat the fruit dough. The extruder then can extrude the fruit dough through a restrictive orifice back to atmospheric pressure to form an extrudate with a porous structure.

As described above, the cutter mill 20 and extruder 22 can be combined into an integrated unit 21, such as a long barrel extruder. The cutting section would generally be located in the early barrels of the extruder between the feed screw and the high-pressure stages. Such an extruder configuration allows feeding dried fruit dices or pieces directly into a feed throat of the extruder without first passing the dried fruit pieces through a comminuting step prior to entering the extruder. The later stages of the extruder are used in the extrusion process to extrude the fruit mass as described herein.

Figure 2:
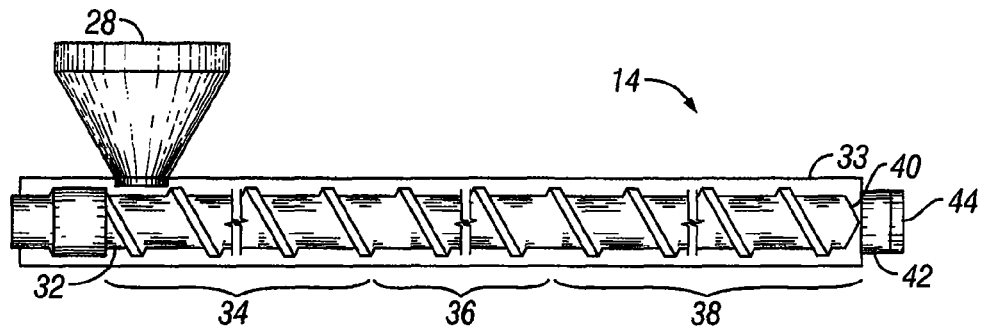
FIG. 2 is a cross-sectional schematic diagram of an exemplary food processing extruder.

Referring briefly to FIG. 2, a cross-sectional schematic diagram of an exemplary food processing extruder is shown. An extruder 14 can be a single screw extruder (as illustrated) or a multiple (such as twin) screw extruder. Depending on the application, size, shape, and amount, each type has advantages and disadvantages. Generally, twin-screw technology is more versatile, whereas single screw technology is less expensive. The extruder 14 can have a variable number of sections 33 (also known as "barrels" or "heads") through which an extruder screw 32 rotates. The extruder screw 32 generally has various diameters, pitch, flight depth, and other design criteria to process the in-feed material from the inlet through the outlet. Regardless of the number of heads, in general, the extruder 14 includes an inlet 28 in which the material to be processed is loaded. A first barrel section is termed a "feed" section 34 that accepts the in-feed material into the processing portion of the extruder in conjunction with the extruder screw. The feed section is generally at ambient temperature and pressure. The next section is termed a transition section 36 because the granular or particulate in-feed material is converted to a homogeneous molten fruit dough. The in-feed material is compressed through a change in the screw pitch, diameter, or other design criteria. The transition section 36 operates with an elevated temperature of approximately 30-70° C. (85-160° F.). A next section is termed a cooking section 38 that creates frictional heat, shear, and compression elevating the material to approximately 70-130° C. (160-260° F.). The material is extruded as an extrudate through an outlet 40 and generally through a die 42 to shape the extrudate and cut it through a cutter 44 into desired pieces.

To maintain a constant cook, food extruders operate under steady-state conditions, with the quantity of raw material input equal to the product output at any given moment. Consequently, smooth flowability of the raw material, that is, a steady in-feed rate into the grooves of the extruder feed screw, is required for optimum performance. Hygroscopic in-feed materials can create stoppages and inhibit uniform flowability by building up on equipment surfaces, creating breakaway, high-moisture lumps (surges) that destabilize or eventually can blind the extrusion in-feed.

The solution offered by the present disclosure provides a high percentage of fruit in-feed material while avoiding the hygroscopic in-feed fruit materials of prior efforts. The present disclosure provides a "wetter" in-feed fruit material more suitable for fruit dough formation in an extruder process, while still providing the fruit materials in a form that is appropriate to the extrusion process.

The process offers the following advantages over current technology:

1. 100% fruit or fruit blended with other ingredients may be fed directly into the extruder, greatly simplifying the current technology that requires (a) drying of fruit puree on a flaking roll to 5% moisture level or less (b) grinding and sifting the resulting dried fruit flakes or pieces, reducing them to powder form, and (c) re-hydrating the powder in the extruder.

2. Directly feeding the dried fruit into the extruder via an Urschel mill or the like, or directly feeding fruit grinds greatly simplifies the handling of the fruit because the dried fruit is only slightly hygroscopic, whereas the fruit powder (5% moisture or less) is very hygroscopic, necessitating dehumidified plant air or limited exposure to atmospheric air or special equipment to deal with chronic caking, sloughing and blockage problems associated with hygroscopic ingredients.

3. Dried fruit pieces retain much more of the native fruit juice (13 to 30%) with its flavor and aroma components than dried fruit powder (5%), which generally is spray dried on a carrier comprising 10 to 50% of the total weight of the fruit powder. For processing, dried fruit powder must be re-hydrated in the extruder with water or some other liquid, whereas dried fruit can be extrusion processed using the native fruit juice alone.

Alternatively, as shown in FIG. 1A, the non-fruit supply 14 can provide the non-fruit ingredients, such as flour and sugar, to the mixer 16 for blending. The blended materials can be stored in the surge hopper 18, and metered into an extruder pre-conditioner of the extruder 22. Still further, the non-fruit supply can be directly supplied to the surge hopper 18, for example, if the mixer 16 was unnecessary, or can be fed even directly to the extruder 22. Similarly, the fruit can be fed into a surge hopper 18A, then to the mill 20, and to the extruder 22 from the mill 20.

Returning to FIG. 1, after the extruder 22, the extrudate can be dried to a selected level in a drier 24, such as a hot-air drier, as a prefinished food product. The product exiting the drier can have a moisture content of less than about 10% and advantageously less than about 6%. The water activity can be less than about 0.55 and advantageously less than about 0.3.

In at least one embodiment, the extrudate is hot from the extrusion die and can be distributed evenly onto the belt of a hot-air drier. Another drier that can be used is a fluidized bed drier that passes a gas (usually air) through a product layer under controlled velocity conditions to create a fluidized state of the product and increase exposure to the gas. Yet another drier can be use of a freeze drier with an increased efficiency over conventional freeze-drying of fruit due to the expanded nature and low density of the herein disclosed extruded food product. The product can be discharged from the drier at the desired moisture by varying the temperature and residence time in the drier. Generally, the product texture will be specified to be hard (like hard candy) or crunchy (like Post® brand Grape-Nuts® cereal) or crispy (like corn flakes) or chewy (like taffy), in contrast to higher moisture gelled fruit products that are not dried.

For fruit meal, a mill 26, such as a roller mill or other appropriate milling technology including the "cutter mill" described herein, can be used after the drier to reduce the particle size of the extrudate to the desired range. A sifter 28 can be used to screen the extrudate to certain sizes for ultimate packaging. A packer 30 can package the product in a variety of soft and hard containers, including weather resistant packaging and can further include vacuum or controlled atmosphere processing.

The following process is described as at least an exemplary, non-limiting process, as the disclosure provides for multiple variations and others known to those with ordinary skill in the art, given the disclosure herein: An in-feed material of 100% fruit from a single ingredient, dried fruit pieces, is fed into an Urschel™ brand mill fitted with a cutting head fine enough to reduce the dried fruit pieces to comminuted dried fruit pieces, thereby substantially disrupting the physical structure of the fruit. The feed rate into the mill is set at a constant speed equal to the output rate of the production line. The mill discharges comminuted dried fruit pieces directly into the feed section of the extrusion processor, which is operated under conditions to create a slight aeration or puffing of the extrudate. The extrudate is continuously fed into a drier, where moisture is reduced as desired below a water activity less than 0.55, and the finished product can be sized, shaped, and/or packaged.

Alternatively, to manufacture a product of the invention containing 100% fruit composed of more than one dried fruit ingredient, a blending step is inserted before the cutter mill feeding the extruder throat to create a uniform in-feed.

Further, to manufacture a product of the invention containing less than 100% fruit, the ingredients can be blended prior to the extrusion in-feed step. Dried fruit grinds can be used for blends in which the grinds represent 80% or more of the blended formulation because ingredient stratification or segregation by size (density) is not problematic in this range. With dried fruit concentrations between one-third and 80%, blending techniques well known in the art are employed to maintain a homogeneous mixture. Although the percentage of dried fruit can vary in the finished product depending on the desired market, it is contemplated that the product will contain at least one-third fruit, generally at least 40%, advantageously at least 75%, and in some embodiments 100% fruit.

The fruit food product is extruded at elevated pressures (generally 25 to 1500 pounds per square inch at the die) and elevated temperatures (generally from 70° to 130° C. (160°-260° F.) at the die) to lower the product density (i.e., to puff the extrudate) below that of the fruit dough material inside the extruder and to greatly increase the total product surface area (both internally and externally) by creating a porous, fine, honey-comb-like internal structure and an expanded overall product volume. This honey-comb structure accomplishes several physical functions, including: (1) facilitating the drying of the extrudate by greatly expanding the product surface area internally and externally, allowing increased hot air contact with the product; (2) creating a honey-comb-like structure having a multitude of thin walls, making the texture of the dried product lighter and crispier to the bite; (3) increasing the product volume slightly for heightened visual impact.

In formulations with less than 100% fruit in which starches or flours are admixed with fruit prior to extrusion, the extrusion processor cooks (gelatinizes) the raw starches, creating a carbohydrate film (matrix) that facilitates the entrapment of steam and air inside the extrudate, thus facilitating greater volume expansion and ultimate textural tenderness of the dried finished fruit product.

An additional advantage of extrusion processing of the input food ingredients (the dried fruit and the non-fruit ingredients) at these elevated pressures and temperatures is high temperature/short time (HTST) pasteurization, which occurs as the fruit food traverses the extruder and exits the die, greatly reducing the microbiologic flora to very low levels for enhanced food safety and storage stability. This food safety margin is especially significant in RTE foods that are consumed directly without an intervening cooking step at the consumer level.

Example Of Fruit Meal Production

The technology disclosed herein is applicable to many different categories of existing or potential fruit products. Without limitation, below is an example of a fruit meal of 100% apple.

Commercially available dried sweet-apple dices (approximately 29% natural sugars, Fuji variety) were fed at a continuous rate into an Urschel 1700 Comitrol mill equipped with a fine M-style cutting head to reduce the dices to finely divided apple pulp pieces. These flowed down a chute directly into the feed throat of a 5-head single screw extruder equipped with high-pressure screws, a pressure plate and restrictive die openings to increase the extrusion backpressure. No liquids were added; the native apple juice in the dried apples having 26% residual moisture provided adequate moisture for extrusion processing. From in-feed to exit die, the temperatures in the extrusion heads steadily increased from room temperature in the feed section to 130° C. (266° F.) at the die. The extrudate was sliced at the die face into amorphous lumps approximately 1 cm diameter and was conveyed to a forced-air, continuous-tray drier at 82° C. (180° F.) for 60 min. Drying to 3-5% moisture concentrated the native fruit sugars to approximately 75% sucrose equivalent, creating crunchy candy pieces with a natural, intensely sweet apple flavor made from 100% apple. The water activity was 0.30. The fruit exiting the drier was milled and sifted through a U.S. #10 sieve producing a fruit meal of granulated apple product.

Warmed, Pressed, and Shaped Fruit Products

The above description provides an exemplary process for producing fruit meal, as described in U.S. Publ. No. 2006/0286270 A1, as a processed food or food ingredient that is a granular, free-flowing, hygroscopic form of fruit at 70 degrees F. and low humidity. It may be processed from apples, apricots, peaches, and many others kinds of fruit.

Attention is now turned to forming the fruit meal into a shaped product that differs from traditional methods. The current invention utilizes fruit meal to create shaped fruit foods by a non-traditional application of low heat and pressure, generally, in a forming mold.

The high-fruit-content food products that can be produced according to the present disclosure can vary in shape, texture, and physical properties and the following is merely exemplary. For example, the fruit product can be shaped into a cookie/biscuit with a round relatively thin shape, a thicker square or rectangular shape, or a host of other shapes. Some fruit food products can be shaped to resemble a slice of the fruit, such as a slice of an apple or other fruit. The shape can resemble animals, buildings, or other objects. Similarly, the texture can vary and in general the high fruit product can be crispy or crunchy to add to its appeal as a food, although in some embodiments it could be soft and chewy or hard like candy. For purposes herein, the term "crispy" will be defined as firm but easily broken or crumbled and is exemplified by Cheetos® cheese puffs, potato chips, and crisped rice. For purposes herein, the term "crunchy" is defined as firmer than "crispy" and not as easily broken or crumbled and is exemplified by foods such as Post® brand Grape-Nuts® cereal, granola clusters, and croutons. The term "hard" is harder than "crunchy" and difficult to break without substantial force and is exemplified by hard candy, such as LifeSavers® candies, peanut brittle, and crushed ice. The term "chewy" is defined as softer than "crispy" and is exemplified by taffy candy, Nabisco® Fig Newtons®, and Tootsie Roll® brand chocolate candy.

Figure 3:
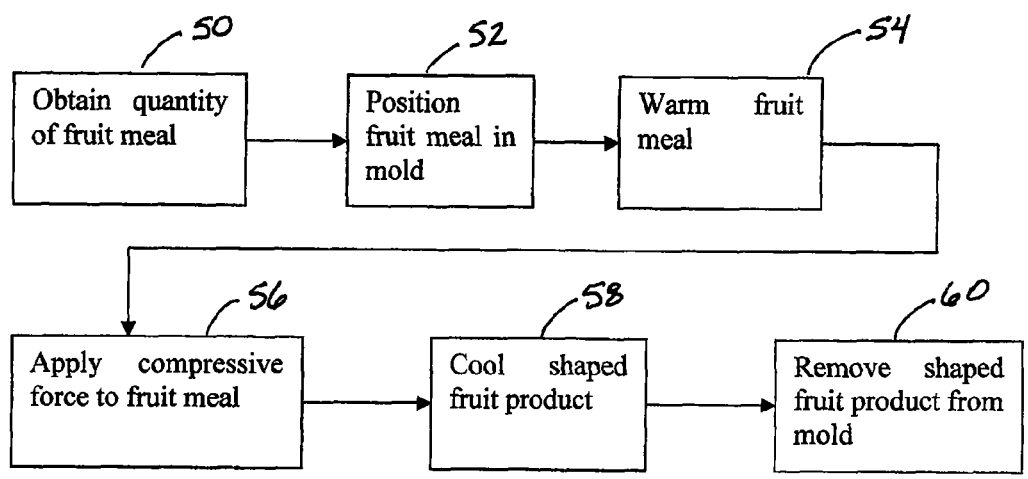
FIG. 3 is a schematic flowchart of an exemplary process for producing a stable, predetermined shape high fruit content product.

FIG. 3 is a schematic flowchart of an exemplary process for producing a stable, predetermined shape high fruit content product. In this new technology, a measured quantity of fruit meal is obtained in step 50. The fruit meal is positioned, such as by placement in a forming mold in step 52. The fruit meal is warmed to a temperature between 80° F. (27° C.) to 200° F. (93° C.) in step 54, and pressed in the forming mold with a measured pressure as a compressive force in step 56. The pressing causes the loosely packed, warm, tacky fruit meal to become more tightly packed and to conform to the mold. The warming does not cook, bake, or significantly desiccate the fruit food being formed. Rather, the heat converts the flowable fruit meal into a slightly tacky granular form that, when compressed, conforms to the shape of the mold. The shaped fruit product is cooled either by allowing it to cool under ambient conditions or accelerating or retarding the cooling under controlled conditions in step 58. Upon cooling such as to room temperature, the fruit product "sets" into a structure that durably retains the form of the mold. The shaped fruit product so formed is removed from the mold in step 60, generally without significant breakage. Advantageously, the shaped fruit meal can be cooled prior to removal from the mold. Alternatively, the fruit meal can be removed from the mold while still warm, with sufficient steps to reduce or prevent breakage of the soft, shaped fruit product prior to its having achieved the "set" temperature, generally lower than 80° F. (27° C.).

The elevated warming temperature causes the crispy or crunchy, free-flowing granules of fruit meal to become more pliable or rubbery; and slightly tacky and less flowable. When a compressing force is applied to the fruit meal in this pliable and tacky state, the granules become more closely associated or packed together. The compressive force can generally be between 1 pound force (0.4 kg) to 16 pounds force (7.3 kg) to the fruit meal for the 2 inch (5 cm) cookie/biscuit while warmed, although lower and higher forces and therefore pressures can be used. Such forces calculate to an approximate equivalent pressure between 0.32 pounds per square inch (2.2 kilopascals "kPa") to 5.1 psi (35.2 kPa). Advantageously, the compressive force can be between 3 pounds force (1.4 kg) to 8 pounds force (3.6 kg) for a calculated pressure between 0.96 psi (17 kPa) to 2.5 psi (17 kPa). The force can be any force between the range of force values, such as 1.1 pounds force (0.49 kg), 1.2 pounds force (0.54 kg), and so forth, and further can be any force between such exemplary forces, such as 1.11 pounds force (0.503 kg), 1.12 pounds force (0.508 kg), and so forth. In like manner, the pressure can be any pressure between such range of pressure values, such as 0.40 psi (2.76 kPa), 0.50 psi (3.45 kPa), and so forth, and further can be any pressure between such exemplary pressures, such as 0.41 psi (2.83 kPa), 0.42 psi (2.90 kPa), and so forth, and still further any pressure between such exemplary pressures, such as 0.411 psi (2.834 kPa), 0.412 (2.841 kPa), and so forth.

Higher pressures tend to increase the density. Thus, different types of fruit products can be created by different pressures and different granulations. For example, a hard cookie/biscuit can be created at higher pressures and in some embodiments can resemble a candy.

When these same granules so packed are allowed to return to a lower temperature, such as room temperature, including temperatures less than about 80° F. (27° C.), the granules become associated together into a unitary shape conforming to the mold. The strength of the associated bonding holding the molded granules together is directly related to the pressure that had been applied to the pliable, warmed fruit meal. Thus, greater compressive force yields a denser, harder, unitary form; and conversely, less pressure yields a less compacted, more fragile, unitary form. With correct application of pressure, the granules are sufficiently bonded that the unitary form is durable to handling, packaging, and other standard conditions. In at least one embodiment, the granules are also bonded into the pressed and shaped fruit product, so that when placed in the mouth and between the teeth, the unitary structure breaks between the teeth with moderate force, causing the individual granules to dissociate from the unitary structure upon mastication. This process gives the sensation of crispiness or crunchiness of the unitary structure, even if the granules themselves forming the unitary structure may be hard to the bite individually at the time.

Fruit meal has been observed to begin a change of physical state from brittle to pliable and tacky, as it increases in temperature above 80° F. (27° C.). While temperatures greater than 80° F. (27° C.) or even greater than 185° F. (85° C.) display this rubbery characteristic, a temperature of approximately 185° F. (85° C.) has been established in testing as a safe temperature to heat white fruits, such as apple or pear, without causing rapid browning of sulfited fruit. At temperatures exceeding 200° F. (93° C.), browning of the fruit is in evidence proportionate to the temperature elevation above 200° F. (93° C.) and to the time the temperature is applied. The temperature can be any temperature between the range of temperature values, such as 90° F. (32° C.), 100° F. (38° C.), and so forth, and further can be any temperature between such exemplary temperatures, such as 91° F. (32.8° C.), 92° F. (33.3° C.), and so forth.

In contrast to traditional cookies, the exemplary cookies/biscuits composed from 100% fruit meal contain no cereal flour or fats (shortening or oils) or salt or added sweeteners or flavorings (that is, no additional flour, fats, salt, sweeteners, or flavorings required for the shaped fruit product). The innate sugars, flavors, fibers, and other natural constituents are derived entirely from the ripe fruit itself. Because cookies made from 100% fruit meal are derived entirely from ripe fruit, no baking is necessary for healthy and nutritious food enjoyment. Consequently, the application to low levels of heat to products made from fruit meal is not related to the traditional baking process for cookies/biscuits.

In contrast, a cooking process of some kind (such as baking, frying, and microwaving) is essential in grain-based foods. The long chain carbohydrates, principally starches, associated with grain seeds (such as wheat berries, corn kernels, rice grains, and the like) must be unraveled from their natural crystalline structure by the judicious application of heat, moisture, and at least a minimum level of shear to allow digestion in the non-ruminant stomach, such as in humans.

In the present disclosure, the long-chain carbohydrates found in ripe fruit are primarily soluble and insoluble cellulosic molecules that form colloidal suspensions which are indigestible in the human stomach, but which perform bulking and sequestering functions beneficial to good health. The requirement of baking in traditional cereal-based cookies/biscuits, when contrasted to the lack of the required cooking, even the undesirability of cooking, in fruit-meal based cookies/biscuits illustrates the difference between traditional cookie/biscuit baking compared to cookie/biscuit formation with warming and moderate pressure for fruit-meal cookies/biscuits.

In many parts of the world, ready-to-eat (precooked) crispy or crunchy breakfast or snack cereal products are a popular food. Most consumers consider such products nutritious and healthy to consume, and many major food marketing firms promote these cereal foods as beneficial to cholesterol lowering and to cardiovascular health. However, many of these products have added sugar levels as high as or higher than the grain content of the product. Others have high levels of added fat. Often marketers formulate these products with vegetable oil, and then emphasize claims such as "no trans fats" or "no cholesterol," despite the high total fat content. Fruit meal can provide a healthy alternative to the formation of breakfast or snack "cereals" with zero fat content and with intense natural sweetness without added sweeteners. Breakfast foods ("fruit cereals") made from 100% fruit meal can be manufactured to mimic the typical characteristics of traditional ready-to-eat cereals, such as overall appearance, shape, texture, flavor, and so forth; yet, they can be composed of whole fruit alone. Fruit meal can be molded into cereal shapes, such as small doughnut shapes, using the same technology utilized in cookie formation. For example, granular fruit meal can be gravity fed onto "O-shaped" depressions on the top surface of a large heated drum, then heated and compressed as the drum rotates, then gently removed while still warm from the drum undersurface, cooled, and packaged. Whereas such shaped cereal-based products traditionally have been formulated with oats or corn or wheat flour, fruit-based analogs would be formulated with sweet apple or tart apple or apricot or peach, or by combinations of complementary fruits, such as apple and cranberry, in much the same way that grains are blended and processed into multigrain cereal products.

The Applicant understands that the starting fruit meal material of the current process is a very complex mixture of organic celluloses, sugars, acids, water and other trace molecular structures (minerals, proteins, etc) in a decidedly non-crystalline form. This structure differs for example from the sugar in the sugar cube process referenced above. And while the crystal growth and partial rehydration of the crystalline surface of molecular sucrose is a classic physical chemistry system well described and understood, the physical chemistry of fruit meal is vastly more complicated, such that it is not understood vis-à-vis the simple properties of a pure crystalline substance. In the formation and shaping process of fruit meal, the initial moisture (bound water at room temperature) is retained, not added to or desiccated. While the fruit meal is placed into a mold at room temperature, the process of shape formation does not occur at room temperature, because the fruit meal is a dry, flowable granule at this temperature. The fruit meal is warmed (generally independent of moisture addition) to a temperature that creates a tacky state by the release of bound water in the fruit meal and the partial dissolving of the complex sugars, acids, starches, and so forth that are native to the particular fruit. The moisture (natural concentrated juices of the native fruit) is equilibrated in the matrix of the fruit meal, not plated on the outside of the granules. The entire matrix is warmed minimally to a temperature to create a tacky matrix without measurable moisture loss, owing to the high osmotic pressure and hygroscopic nature of the matrix. Then while maintaining the tacky, warm state, the matrix is compressed to cause the fruit meal to conform to the shape of the mold. Then the pressure is released, and in at least one embodiment, the fruit meal is allowed to cool to a temperature such that structural durability is restored in a stable form adequately for integral removal of the shape from the form.

Examples Of Formed Fruit Product

An exemplary and non-limiting application of this technology is the formation of a crispy cookie/biscuit made from 100% fruit. A quantity of 10 grams of sweet apple (Fuji variety) fruit meal was placed in the 2-inch diameter cup of a muffin pan, then leveled in the cup and heated at 185° F. (85° C.) for 10 minutes. The warmed fruit meal was momentarily compressed uniformly from the top down in the muffin cup with about 4.4 pounds force (2 kilogram) at a calculated pressure of 1.4 psi (9.7 kPa) that evenly compressed the surface of the fruit meal in the cup, resulting in the formation of a round unitary shape about 0.25 inches (0.5 cm) think conforming to and formed in the bottom of the muffin cup. The shaped fruit product was allowed to cool for 10 minutes, and was removed from the cup. The resulting 100% apple cookie/biscuit was durable to handle and crispy to the bite.

When the same process was repeated with about 2.2 pounds force (1 kg) compression with a calculated pressure of 0.70 psi (4.8 kPa), the cookie formed was much less durable to handling; and it readily crumbled and fell apart in the mouth.

Conversely, when the same process was repeated with about 9 pounds force (4 kg) compression with a calculated pressure of 2.8 psi (19 kPa), the cookie/biscuit formed was hard to the bite, atypical of the friable texture of a traditional baked wheat-flour-sugar-fat cookie/biscuit.

Other and further embodiments utilizing one or more aspects of the inventions described above can be devised without departing from the spirit of Applicant's invention. For example, different quantities of fruit meal can be used and different other ingredients used beside fruit meal. Different granulations can be used and even a mixture of granulation within the same fruit product. Different effects, such as soft, crunchy, crispy, and hard can be achieved by different combinations of temperatures and compressive forces in various compositions of fruit meal. Further, the various methods and embodiments of the fruit products can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and may further include without limitation integrally forming one functional member with another in a unity fashion. The coupling may occur in any direction, including rotationally.

The systems and methods herein have been described in the context of various embodiments and not every embodiment has been described. Apparent modifications and alterations to the described embodiments are available to those of ordinary skill in the art. The disclosed and undisclosed embodiments are not intended to limit or restrict the scope or applicability of the concepts of the Applicant, but rather, in conformity with the patent laws, Applicant intend to protect all such modifications and improvements to the full extent that such falls within the scope or range of equivalent of the following claims.

The invention claimed is:

1. A process for producing a ready-to-eat (RTE) fruit food product, comprising:
    obtaining a quantity of granulated fruit meal from an extrusion process;
    placing the granulated fruit meal into a mold having a predetermined shape;
    then applying a heat to the granulated fruit meal in the mold that is sufficient to cause the granulated fruit meal to become tacky;
    applying a compressive force to the tacky granulated fruit meal in the mold;
    forming the granulated fruit meal into a fruit product having a shape corresponding to the predetermined shape in the mold; and
    removing the shaped fruit product from the mold whereby the shaped fruit product retains its shape after removal from the mold without requiring additional starch or sweetener or fat to the fruit meal.

2. The process of claim 1, wherein the granulated fruit meal has a moisture content of less than 10%, or a water activity level of less than 0.55, or both.

3. The process of claim 1, wherein forming the granulated fruit meal into the shaped fruit product comprises forming the product independent of baking the fruit product.

4. The process of claim 1, wherein applying a heat sufficient to cause the granulated fruit meal to become tacky comprises applying a heat sufficient to cause the fruit meal to be warmed to a temperature between 80° F. (27° C.) to 200° F. (93° C.).

5. The process of claim 1, wherein applying the compressive force comprises applying at least 0.32 pounds per square inch ("psi") (2.2 kilopascals "kPa") to the fruit meal while warmed.

6. The process of claim 1, wherein applying the compressive force comprises applying between 0.32 psi (2.2 kPa) to 5.1 psi (35.2 kPa) to the fruit meal while warmed.

7. The process of claim 1, wherein applying a heat sufficient to cause the fruit meal to become tacky comprises applying a heat sufficient to cause the fruit meal to be warmed to a temperature between 100° F. (38° C.) to 190° F. (88° C.).

8. The process of claim 7, wherein applying the compressive force comprises applying between 0.32 psi (2.2 kPa) to 5.1 psi (35.2 kPa) to the fruit meal while warmed.

9. The process of claim 1, wherein applying the compressive force comprises applying between 0.96 psi (6.6 kPa) to 2.5 psi (17 kPa) to the fruit meal while warmed.

10. The process of claim 1, allowing the tacky fruit meal to cool to ambient air temperature to form the shaped fruit product prior to removing the shaped fruit product from the mold.

11. The process of claim 1, wherein the granulated fruit meal comprises a majority of fruit and the shaped fruit product comprises a majority of fruit meal.

12. The process of claim 1, wherein the shaped fruit product comprises at least 80% fruit.

13. The process of claim 1, wherein the shaped fruit product comprises at least 90% fruit.

14. The process of claim 1, wherein the shaped fruit product comprises at least 99% fruit.

15. The process of claim 1, varying the compressive force to cause the shaped fruit product to vary in texture.

16. The process of claim 1, wherein placing the granulated fruit meal into a mold comprises flowing granules of the granulated fruit meal into the mold.

17. A process for producing a ready-to-eat (RTE) fruit food product, comprising:
    obtaining a quantity of granulated fruit meal;
    forming the fruit meal into a stable predetermined shaped product comprising:
        shaping the fruit meal into a predetermined shape;
        then applying a heat sufficient to cause the fruit meal to become tacky; and
        applying a compressive force to the tacky fruit meal to form the predetermined shape.

18. The process of claim 17, further comprising using a mold to form the predetermined shape.

19. The process of claim 17, wherein forming the fruit meal into the stable predetermined shaped product comprises forming the product independent of baking the product.

20. The process of claim 17, wherein applying a heat sufficient to cause the fruit meal to become tacky comprises applying a heat sufficient to cause the fruit meal to be warmed to a temperature between 80° F. (27° C.) to 200° F. (93° C.).

21. The process of claim 17, wherein applying the compressive force comprises applying at least 0.32 pounds per square inch ("psi") (2.2 kilopascals "kPa") to the fruit meal while warmed.

* * * * *